United States Patent Office 2,723,257
Patented Nov. 8, 1955

2,723,257

VULCANIZED CHLOROSULFONATED POLYMERS

Ambrose McAlevy, Wilmington, Del., assignor to E. I. du Pont de Nemours and Company, Wilmington, Del., a corporation of Delaware No Drawing. Application August 27, 1954, Serial No. 452,715

14 Claims. (Cl. 260—79.3)

This invention relates to a process for the preparation of rubbery synthetic elastomers from high molecular weight chlorosulfonated olefin polymers, and is more particularly directed to the preparation of such elastomers from the chlorosulfonated polymers of ethylene cross-linked with diamines. This application is a continuation-in-part of my copending application Serial No. 289,677, filed May 23, 1952, which is in turn a continuation-in-part of my earlier applications (now abandoned) Serial No. 271,859, filed February 15, 1952 and Serial No. 28,049, filed May 19, 1948.

It is known that when petroleum hydrocarbons are heated in the presence of a suitable catalyst with chlorine and sulfur dioxide, chlorosulfonated hydrocarbons having valuable and important properties are formed. In the McQueen U. S. Patent 2,212,786, issued August 27, 1940, a process is described for the chlorosulfonation of high molecular weight hydrocarbons such as polythene, and the subsequent modification of these products by treating them with any alkali metal or alkaline earth metal hydroxide or any quaternary ammonium base. In the McAlevy et al. Patents 2,416,060 and 2,416,061 such compounds are treated with polyvalent metal compounds and other adjuvants to make valuable synthetic elastomers.

An object of the present invention is to provide chlorosulfonated higher molecular weight polymers of ethylene modified by diamines. A further object is to provide a process for the vulcanization of chlorosulfonated solid polymers of ethylene having a molecular weight of at least 1000 with a diamine as the vulcanization agent. Another object is to provide new compositions of matter prepared in accord with the aforesaid processes. Other objects and advantages of the invention will hereinafter appear.

In accord with the invention, valuable products are produced from chlorosulfonated high molecular weight polymers of ethylene by treating them with an aromatic primary diamine having the formula $NH_2$—R—$NH_2$ wherein R represents a member of the group consisting of divalent aromatic hydrocarbon radicals containing 1–2 benzene rings and in which the free valences are on different carbon atoms and mono- and di-alkoxy substituted radicals of such class. These diamines have at least one replaceable hydrogen atom, e. g. they have at least one amino group which reacts with the —$SO_2Cl$ group of the chlorosulfonated polymer, which produces cross-linking through sulfonamide linkages R—$SO_2$—N<. Prior to this invention it was believed that vulcanized elastomers from the chlorosulfonated polymers of ethylene could be made only if there was present as a cross-linking agent a polyvalent metal compound. It has been found, however, that valuable rubbery elastomers can be made through sulfonamide cross-linkages in the absence of those polyvalent metal compounds, although the presence of such metal compounds is not excluded.

The chlorosulfonated solid polymers of ethylene, herein referred to as chlorosulfonated polyethylene, which are to be treated in accord with the process of this invention, may be prepared by any suitable process such as those disclosed in U. S. Patent 2,586,363. The molecular weight of the polymer and the type of polymer used in making it determines, inter alia, the chemical and physical properties of the modified product. The invention, accordingly, contemplates the use of ethlyene polymers ranging in molecular weight from 1,000 to 50,000 and more, these polymers and methods for preparing them being well-known to the art. The degree of chlorosulfonation is likewise important in providing a modified chlorosulfonated polyethylene having the most desirable properties. For example, and on a percentage by weight basis for the chlorosulfonated polymers of ethylene, the chlorine content may range from about 20% to about 45% and preferably from about 25% to about 35%. Similarly, the optimum range of combined sulfur content of the polymer may range on a percent by weight basis from 0.4% to about 3% and preferably from about 1.3% to about 2.3%.

The diamines, which may be employed in accordance with this invention, are aromatic primary diamines, that is, they contain two primary amino ($NH_2$) groups attached to different ring carbon atoms. They may be represented by the formula $NH_2$—R—$NH_2$ wherein R represents a divalent aromatic radical containing 1 to 2 separate and distinct benzene rings and in which the free valences belong to different ring carbon atoms. Preferably, R contains 2 benzene rings in which the free valences belong to ring carbon atoms of different benzene rings. Also, when R contains 2 benzene rings, such rings preferably are linked directly to each other by a single carbon-carbon bond as in the biphenyl series, but they may be linked through a divalent aliphatic radical as in the diphenylalkane series. R may be hydrocarbon, that is, it may consist of carbon and hydrogen. Also, R may contain 1 to 2 alkoxy groups and otherwise consist of carbon and hydrogen, preferably with not more than one alkoxy group on each benzene ring. Representative diamines are benzidine and its isomers, the tolidines, the dianisidines, the di-(aminophenyl) alkanes, the phenylene diamines, and the toluylene diamines.

The diamines may be employed in a proportion of from about 0.05% to about 20% by weight based on the chlorosulfonated polyethylene, preferably, from about 5% to about 20%. They may be employed singly, or two or more may be employed together.

The process for preparing the products of this invention comprises mixing the diamine or diamines with the chlorosulfonated polyethylene by any method that is used in the compounding of rubber, such as milling, and heating the mixture at a temperature from about 100° C. to about 200° C., preferably at from about 140° C. to about 160° C., to effect the vulcanization. Other compounding ingredients used in rubber may also be incorporated in the manner well known in the compounding of rubber, such compounding ingredients including reenforcing agents, fillers, pigments, colors, additional curing agents, and the like.

In order to more clearly illustrate this invention, preferred modes of carrying it into effect, and advantageous results to be obtained thereby, the following examples are presented in which the parts are by weight:

EXAMPLES

A chlorosulfonated polyethylene elastomer containing about 1.5% sulfur and about 27% chlorine was compounded with the ingredients shown below on a rubber mill and the compounds were cured and tested, using throughout the procedures commonly used for rubber.

2,723,257

Table I.—Cures with various diamines

| Example No. | 1 | 2 | 3 | 4 | 5 |
|---|---|---|---|---|---|
| Curing Agent | Benzidine | Tolidine | Dianisidine | p-Phenylene diamine | 1, 2, 4-Toluylene diamine |
| (per 100 parts of polymer) | 15 | 15 | 15 | 20 | 15. |
| Barium sulfate | 30 | | | | |
| Rosin | | 2.5 | 2.5 | | |
| Cure (min./°C.) | 30/150 | 60/150 | 60/150 | 30/150 | 30/150. |
| Tensile strength | 2,050 | 1,900 | 1,225 | 1,900 | 1,300. |
| Elongation at break | 210 | 620 | 430 | 100 | 500. |
| Percent weight increase 7 days in boiling water | 34.13 | 70.2 | 7.5 | 99.0 | 196.0. |

| Example No. | 6 | 7** | 8** |
|---|---|---|---|
| Curing Agent | p,p'-Diamino diphenylmethane | | Litharge. |
| (per 100 parts of polymer) | 15 | | 40. |
| Carbon Black (semi-reinforcing furnace black) | 20 | | 32.5. |
| Barium sulfate | | | 2.5. |
| Rosin | | | 3.0. |
| Mercapto benzothiazol | | | |
| Cure (min./°C.) | 30/100 | 30/160 | 30/160. |
| Tensile strength | 1,850 | 400 | 2,075. |
| Elongation at Break | 250 | | 325. |
| Percent weight increase 7 days boiling water | 20.5* | | 3.5. |

*7 Days at 70° C.
**Examples 7 and 8 are not embodiments of the invention but are given for purposes of comparison.

Table II.—Cures with benzidine

| Example No. | 9 | 10 | 11 | 12 |
|---|---|---|---|---|
| Benzidine | 5 | 5 | 20 | 20 |
| Carbon black (semi-reinforcing furnace black) | | 20 | | |
| Cure—10 min./140° C.: | | | | |
| Tensile strength | 1,113 | 1,553 | 2,240 | 2,270 |
| Elongation at break | 550 | 1,720 | 300 | 202 |
| Cure—30 min./160° C.: | | | | |
| Tensile strength | | 1,723 | 2,210 | 2,540 |
| Elongation at break | | 245 | 210 | 163 |

It will be seen from the tables that a variety of diamines act as effective curing agents for the chlorosulfonated polyethylene, giving tensile strengths very much greater than obtained without any agent and comparable with those obtained with the best polyvalent metal oxides. The diamines of the present invention have the advantage over the polyvalent metal oxides of not making the stocks lose transparency and of being required in smaller amounts.

The products of the invention have many uses. For example, they may be used as plasticizers, softeners, conditioning agents for cellulose derivatives, as ingredients for coating compositions in molding, fabric coating in tanning of leather, as well as typical elastomeric applications and the like.

What is claimed is:
1. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and an aromatic primary diamine having the formula NH₂—R—NH₂ wherein R represents a member of the group consisting of divalent aromatic hydrocarbon radicals containing 1–2 benzene rings and in which the free valences are on different carbon atoms and mono- and dialkoxy substituted radicals of such class.

2. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and an aromatic primary diamine having the formula

NH₂—R—NH₂ wherein R represents a divalent aromatic hydrocarbon radical containing 1–2 benzene rings in which the free valences are on different carbon atoms.

3. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and an aromatic primary diamine having the formula NH₂—R—NH₂ wherein R represents a divalent aromatic hydrocarbon radical containing 2 benzene rings in which the free valences are on different rings.

4. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and benzidine.

5. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and tolidine.

6. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride groups and dianisidine.

7. A rubbery elastomer comprising a chlorosulfonated solid polymer of ethylene, originally containing from about 20% to about 45% chlorine and from about 0.4 to about 3% sulfur in the form of sulfonyl chloride groups, which has been cross-linked through sulfonamido groups formed with the sulfonyl chloride and p,p'-diamino diphenylmethane.

8. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of an aromatic primary diamine having the formula NH₂—R—NH₂ wherein R represents a member of the group consisting of divalent aromatic hydrocarbon radicals containing 1–2 benzene rings and in which the free valences are on different carbon atoms and mono- and di-alkoxy substituted radicals of such class, and then heating such mixture at a temperature of from about 100° C. to about 200° C.

9. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing iwth such polymer from about 0.05% to about 20% of an aromatic primary diamine having the formula $NH_2$—R—$NH_2$ wherein R represents a divalent aromatic hydrocarbon radical containing 1–2 benzene rings in which the free valences are on different carbon atoms, and then heating such mixture at a temperature of from about 100° C. to about 200° C.

10. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of an aromatic primary diamine having the formula $NH_2$—R—$NH_2$ wherein R represents a divalent aromatic hydrocarbon radical containing 2 benzene rings in which the free valences are on different rings, and then heating such mixture at a temperature of from about 100° C. to about 200° C.

11. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of benzidine, and then heating such mixture at a temperature of from about 100° C. to about 200° C.

12. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of tolidine, and then heating such mixture at a temperature of from about 100° C. to about 200° C.

13. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of dianisidine, and then heating such mixture at a temperature of from about 100° C. to about 200° C.

14. A process for the preparation of a vulcanized elastomer from a chlorosulfonated solid polymer of ethylene containing from about 25 to about 45% chlorine and from about 0.4 to about 3% sulfur as sulfonyl chloride groups which comprises mixing with such polymer from about 0.05% to about 20% of p,p'-diamino diphenylmethane, and then heating such mixture at a temperature of from about 100° C. to about 200° C.

No references cited.